Patented June 7, 1932

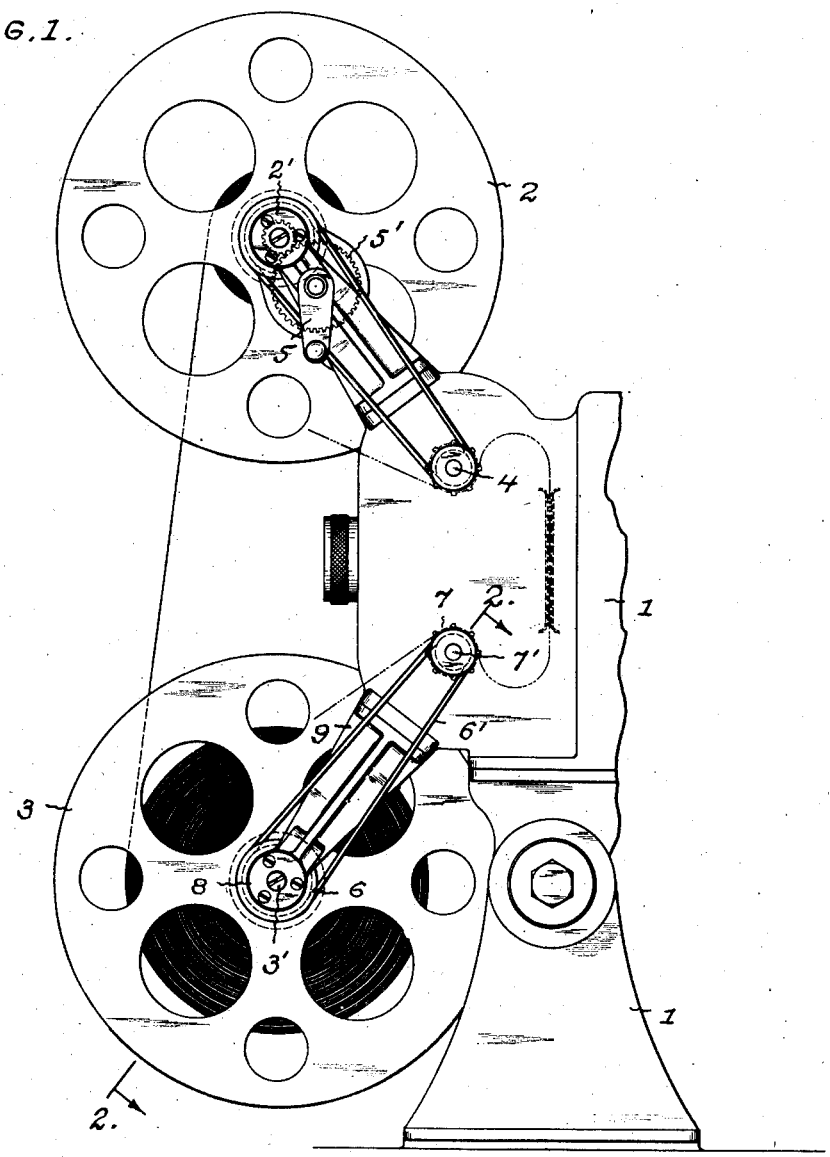

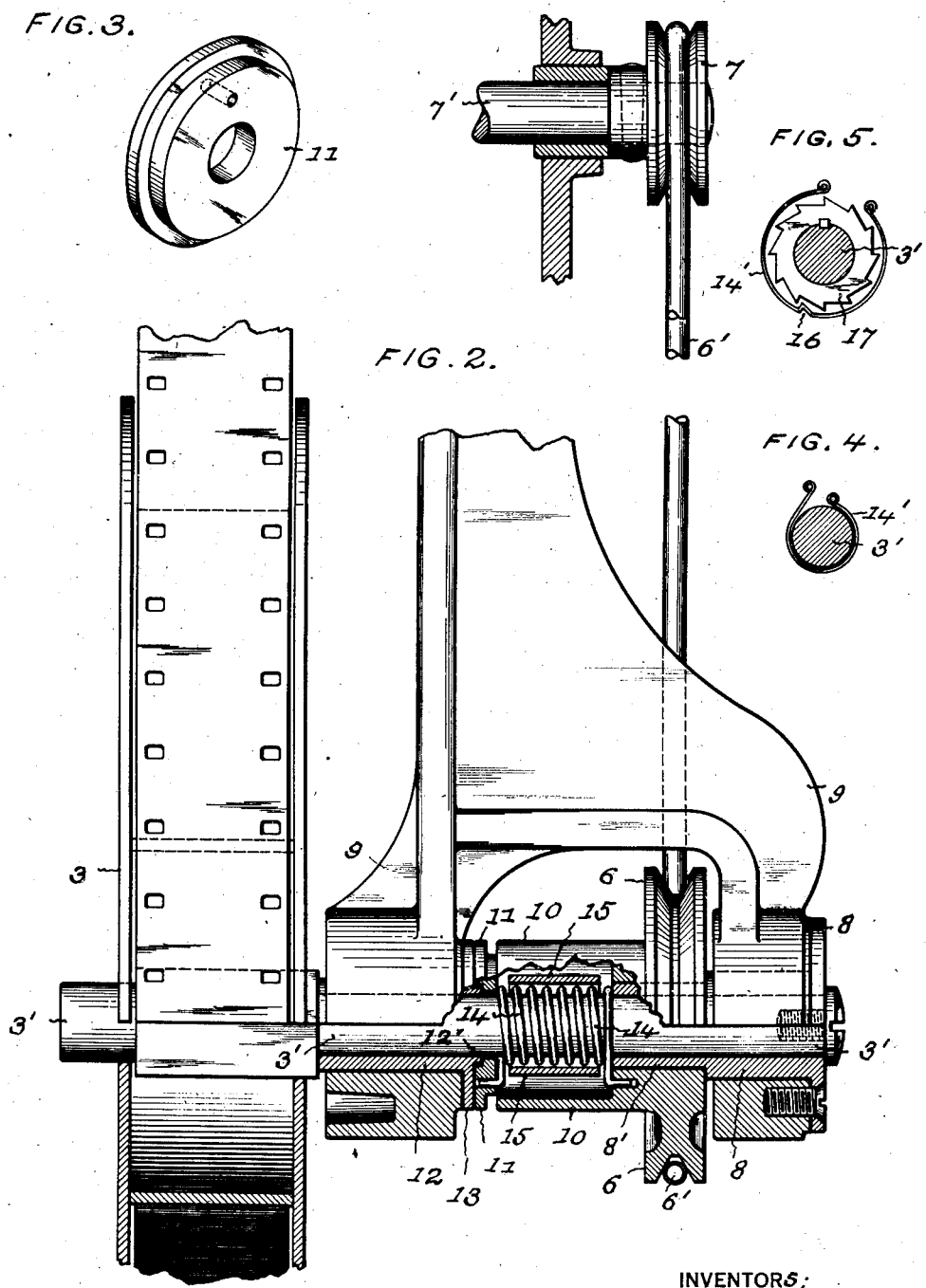

1,861,584

UNITED STATES PATENT OFFICE

WILLIAM C. READEKER AND EDWIN H. OMARA, OF CHICAGO, ILLINOIS

ONE-WAY CLUTCH MECHANISM FOR REELING APPARATUS

Application filed September 18, 1930. Serial No. 482,682.

This invention relates to that type of motion picture projection apparatus in which the film feeding mechanism is capable of operation in a reverse direction to effect a rewinding of the film from the take-up reel back onto the film delivery reel, ready for reuse in a subsequent exhibition, after a passage of the film from such delivery reel, through the projecting zone of the apparatus and onto the take-up reel in a previous operation of the apparatus in projecting or exhibiting the subject matter of the film. And this improvement has for its object:

To provide a structural formation and combination of parts in the film reeling mechanism, in which a driving unit associated with the carrying shaft of the take-up reel and revolving in unison with the driving mechanism of the motion picture apparatus is adapted at the commencement of the normal operation of the film reeling mechanism, with a movement of the film from the delivery reel to the take-up reel, to move into driving engagement with said carrying shaft and impart thereto and the film take-up reel mounted thereon rotation in a take-up direction during a normal exhibiting operation of the apparatus, and with an ending of such exhibiting operation, the members of said driving unit being adapted to automatically move out of the described operative engagement with said carrying shaft of the take-up reel, to thus remove said driving unit as a consequent impedance in a film rewinding operation and the liability of a parting of the film due to such impedance, all as will hereinafter more fully appear.

In the accompanying drawings:

Fig. 1 is a side elevation of a motion picture projecting apparatus showing the preferred construction of parts in this invention.

Fig. 2 is an enlarged fragmentary end view with parts broken away and in section on line 2—2 Fig. 1.

Fig. 3 is a detail perspective view of the frictionally held abutment member of the driving unit of the mechanism.

Figs. 4 and 5 are diagram views of modifications of the resilient clutch member.

Like reference numerals indicate like parts in the different views.

In film reeling mechanisms of the present type heretofore in general use, a one way clutch of the pawl and ratchet or like type was provided between the driving unit and the carrying shaft of the film take-up reel in effecting the normal take-up rotation of said reel, with said one way clutch intended to permit a rotation of said carrying shaft independent of the driving unit, in the subsequent operation of rewinding the film from said take-up reel back onto the delivery reel. Such provision however necessitated either that the endless driving belt between said unit and the mechanism of the motion picture apparatus be removed from driving engagement with said unit, or that the sheave of the unit be made capable of slippage in said endless driving belt. In such older form of the film reeling mechanism, the requirement of a removal of the endless driving belt as above set forth has been found to be a very objectionable feature in that it necessitated a replacement of said belt before a succeeding projecting operation of the motion picture apparatus, in that with a failure to make such belt replacement, the take-up reel would not receive its normal take-up rotation and the film passing from the film feeding mechanism would pile up in a loose mass at the base of the apparatus.

As represented in the drawings, the main housing 1 of the motion picture projecting apparatus supports the film delivery reel 2 and the film take-up reel 3, arranged in vertically spaced relation, and in Fig. 1 the picture film is shown in full lines in its position during a film rewinding operation and in dotted lines in its position during the normal exhibiting operation of the apparatus.

As shown in Fig. 1, the carrying shaft 2' of the film delivery reel 2, has the usual intermediate endless belt and sheave and one way clutch connection (not shown) with a shaft 4 of the film feeding mechanism with a view to aid in the delivery of film to such mechanism in the normal exhibiting operation of the apparatus. In addition the usual manually actuated mechanism, comprising a hand crank 5 and intermediate gears 5', has operative connection with the shaft 2' of the reel 2, for use in effecting a reverse rotation of said reel in a film rewinding operation. In a similar manner, and as shown in Figs. 1 and 2, the carrying shaft 3' of the film take-up reel 3 has operative connection through the hereinafter described driving unit, sheaves 6, 7 and endless belt 6' with a shaft 7' of the film feeding mechanism of the apparatus, in order to effect a winding of the film as it comes from such feeding mechanism upon said take-up reel 3.

The material feature of this invention, in connection with a film reeling mechanism substantially of the type above described, comprises a driving unit for the carrying shaft 3' of the film take-up reel 3, of a construction preferably as follows:

The sheave 6, above referred to as receiving rotary movement from the endless belt 6', is mounted loosely in concentric relation to the carrying shaft 3' of the take-up reel 3, and preferably on an annular extension 8' of a bushing 8 that is fixed in an orifice of the stationary supporting bracket 9 of the take-up reel 3 and its accessories, with such bushing providing one of the bearings for said carrying shaft 3'. In addition said sheave is formed with a sleeve extension 10, in order to provide an enclosure for the hereinafter described clutching means of the present driving unit and of which the sheave 6 and the aforesaid extension 10 constitutes a part.

In spaced relation to the aforesaid sheave 6, a frictionally held abutment member or disk 11 is mounted in loose concentric relation to the carrying shaft 3' of the film take-up reel 3, and preferably on an annular ledge 12' of a bushing 12 fixed in an orifice in the aforesaid supporting bracket 9, with such bushing forming the companion bearing for the reel carrying shaft 3' aforesaid. In the construction shown the bushing 12 is formed with an out turned flange 13 to afford a frictional contact face for abutting engagement with the aforesaid abutment disk 11, which is held to such contact, preferably by the lengthwise expansive action of the resilient member to be described.

A resilient member 14, preferably of the contractile helical type shown in Fig. 2, has encircling relation on the aforesaid reel carrying shaft 3', with one end having fixed engagement in an orifice formed therefor in a side of the sheave 6, and with the other end having like fixed engagement in an orifice formed therefor in a side of the frictionally held abutment disk 11 aforesaid.

In such construction the normal longitudinal expansion of the helical resilient member 14 is adapted to maintain the required degree of frictional contact of said disk with a contact face on the flange 13 of the bushing 12. Such arrangement is preferred over a separate spring for such purpose in that the longitudinal expansive action of the resilient helical member 14 is materially weakened when the coils of said member are brought in constrictive engagement with the reel carrying shaft 3', in the manner now to be described.

With the arrangement of parts above described, a starting movement of the sheave 6 in the take-up direction will cause a constriction of the helical resilient member 14 and cause the same to forcibly grip the perimeter of the carrying shaft 3' and effect a rotation of the same in unison with the sheave 6 and the film feeding mechanism of the apparatus. As the sheave 6 ends or ceases its above described driving movement, the stress by which the resilient helical member 14 is held in constrictive engagement with the carrying shaft 3' is removed and said resilient member 14, due to its normal expansion tendency leaves its driving engagement with the carrying shaft 3' so that the same and the take-up reel 3 mounted therein, is free to rotate in the rewinding operation of the film reeling mechanism, entirely free from any impedance on the part of the sheave 6 and its associated parts, and without any necessity of removing the endless band 6' from engagement with said sheaves.

As shown in Fig. 2, a sleeve 15 is arranged to loosely encircle the spiral resilient member 14, and is adapted to hold said member from undue expansion and movement away from the carrying shaft 3' of the film take-up reel 3.

While the multiple convoluted type of helical member 14 shown in Fig. 2 is the preferable construction, it is within the scope of this invention to employ a single helical convolution 14' as shown in Fig. 4. And also to provide said convolution 14' with a pawl projection 16 adapted for positive driving engagement with a ratchet tooth formation 17 on the perimeter of the shaft 3' aforesaid.

Having thus fully described our invention, what we claim and desire to secure by Letters Patent is:—

1. In a clutch mechanism of the type described, the combination of a fixed support, a shaft journalled in said support, a revoluble driving member journalled on said support in concentric relation to said shaft, a loose friction member encircling said shaft in spaced relation to said driving member and adapted for frictional retarded contact with the fixed support aforesaid, and a resilient clutch member attached at one end to said driving member and at the other end to said loose friction member, and having driving engagement with said shaft in one direction only, said clutch member when not in engagement with said shaft acting to maintain frictional engagement between the loose friction member and the fixed support.

2. A clutch mechanism as in claim 1, and wherein the fixed support is provided with an annular extension as a bearing for the revoluble driving member.

3. A clutch mechanism as in claim 1 and wherein the fixed support is provided with an annular extension as a bearing for the loose friction member.

4. A clutch mechanism as in claim 1 and wherein the resilient clutch member is of a helical form encircling the shaft.

5. A clutch mechanism as in claim 1, and wherein a holding sleeve loosely encircles the helical resilient member to hold the same from undue expansion.

In testimony whereof we hereunto affix our signatures.

WILLIAM C. READEKER.
EDWIN H. OMARA.